(12) United States Patent
Siler et al.

(10) Patent No.: US 6,367,593 B1
(45) Date of Patent: Apr. 9, 2002

(54) ELECTRIC CALIPER HAVING SPLINED BALL SCREW

(75) Inventors: Ernest R. Siler, Springboro; David B. Drennen, Bellbrook, both of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/935,117

(22) Filed: Aug. 22, 2001

(51) Int. Cl.[7] ............................................... F16D 55/16
(52) U.S. Cl. ...................................... 188/72.1; 188/162
(58) Field of Search .............................. 188/72.1, 72.8, 188/156, 157, 158, 162, 202, 196

(56) References Cited

U.S. PATENT DOCUMENTS

| 4,804,073 | A | * | 2/1989 | Taig et al. ................. 188/72.1 |
| 4,836,338 | A | * | 6/1989 | Taig ........................... 188/72.1 |
| 4,850,457 | A | * | 7/1989 | Taig ........................... 188/72.1 |
| 5,219,048 | A | | 6/1993 | Shaw et al. |
| 5,246,283 | A | | 9/1993 | Shaw et al. |
| 5,667,284 | A | | 9/1997 | Drennen et al. |
| 5,915,504 | A | * | 6/1999 | Doricht ....................... 188/72.1 |
| 6,139,460 | A | | 10/2000 | Drennen et al. |

* cited by examiner

Primary Examiner—Christopher P. Schwartz
(74) Attorney, Agent, or Firm—Scott A. McBain

(57) ABSTRACT

A ball screw assembly for a motor vehicle electric caliper comprises a ball screw, a carrier, and a ball screw nut. The ball screw has at least one internal groove, and the carrier has at least one projection engaging the at least one groove. The ball screw nut operatively engages the ball screw.

20 Claims, 2 Drawing Sheets

US 6,367,593 B1

ELECTRIC CALIPER HAVING SPLINED BALL SCREW

TECHNICAL FIELD OF THE INVENTION

The present invention relates generally to brakes for motor vehicles, and more particularly to an electric caliper for a brake system in a motor vehicle.

BACKGROUND OF THE INVENTION

A brake system for a motor vehicle, and in particular an automotive vehicle, functionally reduces the speed of the vehicle or maintains the vehicle in a rest position. Various types of brake systems are commonly used in automotive vehicles, including hydraulic, anti-lock or "ABS," and electric or "brake by wire." For example, in a hydraulic brake system, the hydraulic fluid transfers energy from a brake pedal to a brake pad for slowing down or stopping rotation of a wheel of the vehicle. Electronics control the hydraulic fluid in the hydraulic brake system. In the electric brake system, the hydraulic fluid is eliminated. Instead, the application and release of the brake pad is controlled by an electric caliper.

Traditionally, hydraulic fluid is a very efficient means of transferring a load, since a brake system in an automotive vehicle must be able to transfer a load of about fourteen thousand (14,000) pounds. An electric brake system accomplishes this load transfer through the electric caliper. Generally, the electric caliper includes a motor and a gear system. Typically, either a few large gears or many small gears for the gear system are needed to achieve the necessary load transfer. Also, the geometry of the motor influences its efficiency, since the preferred shape is long and thin. However, there is a limited amount of space available in the wheel for packaging the type of gears or motor necessary to obtain the same load transfer as in the hydraulic brake system. Therefore, space limitations constrain the use of an electric caliper in an automotive vehicle.

SUMMARY OF THE INVENTION

The present invention is a ball screw assembly for a motor vehicle electric caliper. The ball screw assembly comprises a ball screw, a carrier, and a ball screw nut. The ball screw has at least one internal groove, and the carrier has at least one projection engaging the at least one groove. The ball screw nut operatively engages the ball screw.

Accordingly, it is an object of the present invention to provide an electric caliper for a brake system that can be packaged within the available space of a wheel.

Another object of the present invention is to provide an electric caliper including a ball screw.

Still another object of the present invention is to provide an electric caliper of the type described above that has a ball screw positioned around a motor which effectively increases gear reduction capability of the ball screw.

Still another object of the present invention is to provide an electric caliper of the type described above which reduces the number of parts found in prior art electric calipers, and reduces the cost of manufacturing the remaining parts.

Still another object of the present invention is to provide a ball screw assembly of the type described above which has a ball screw with internal splines or keyways.

These and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
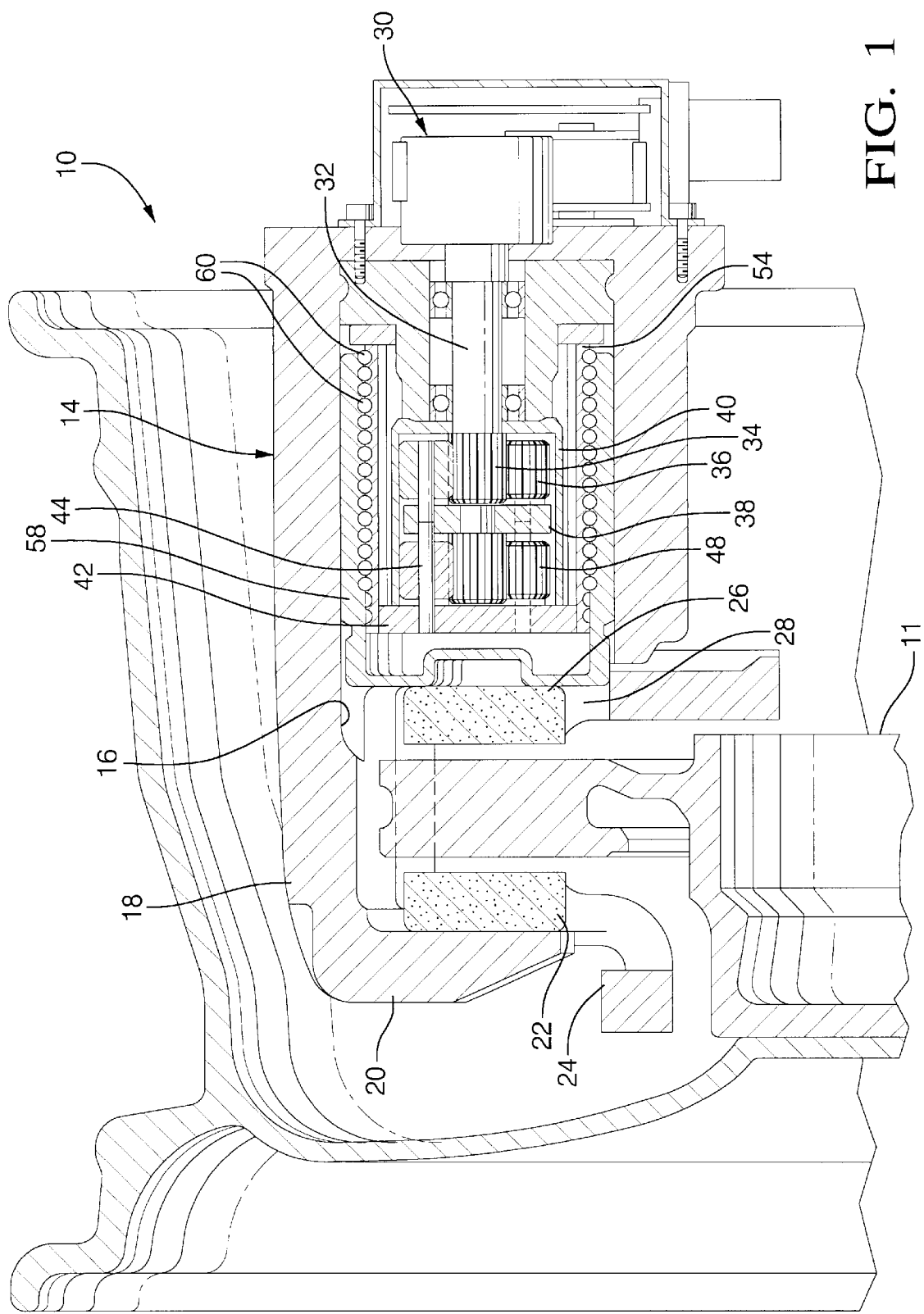
FIG. 1 is a fragmentary elevational view of an electric caliper according to the present invention.
Figure 2:
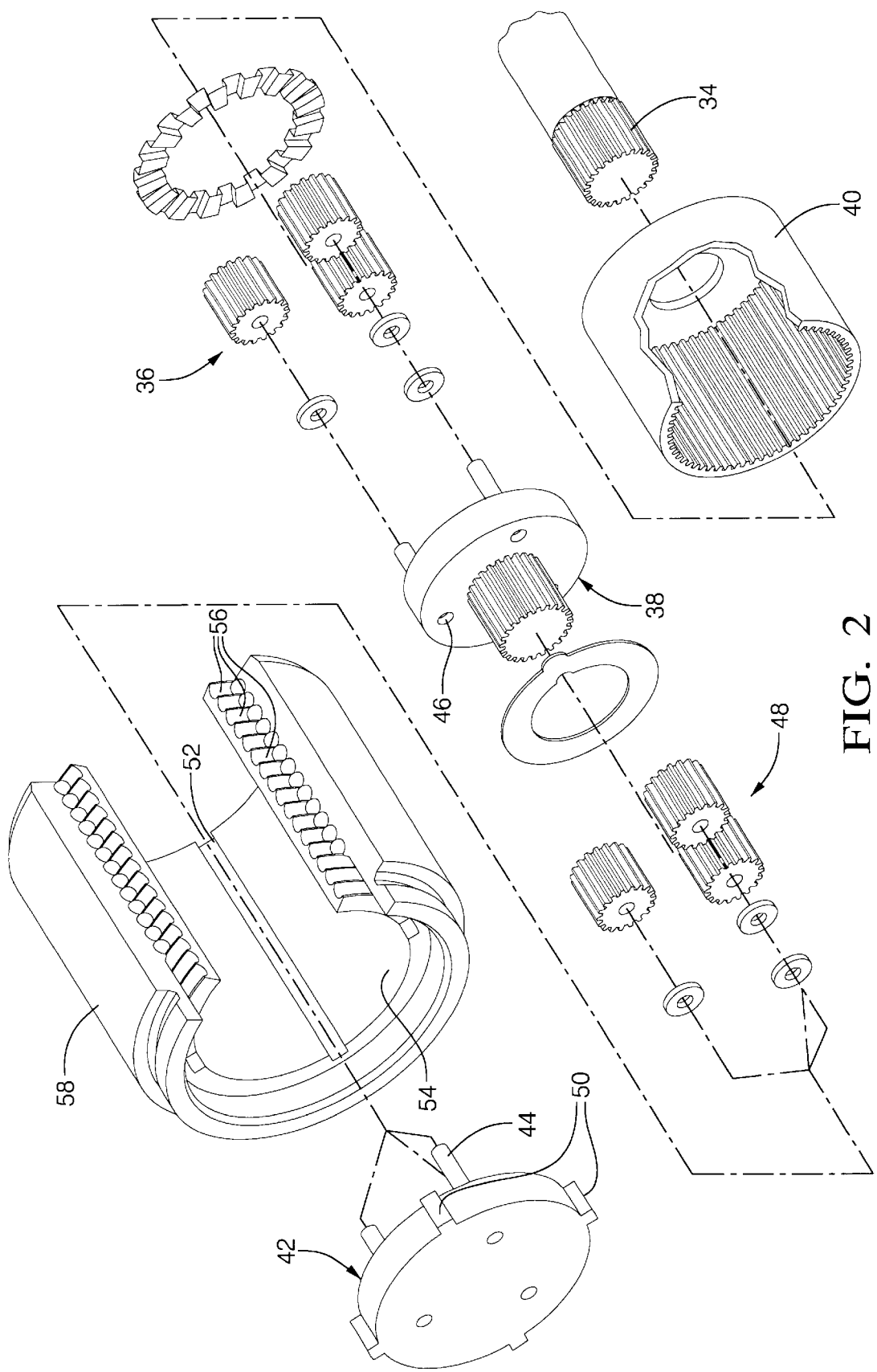
FIG. 2 is an exploded view of a portion of the electric caliper of FIG. 1

FIGS. 1 and 2 show one embodiment of an electric caliper 10 according to the present invention for a brake system such as of the disc brake type to slow or stop rotation of a wheel (not shown) of a motor vehicle. The brake system includes a brake pedal (not shown) which communicates a signal from a driver of the motor vehicle to the electric caliper 10. Rotation of a disc or rotor 11 is slowed down or stopped by engaging the electric caliper 10 which displaces a pair of resilient friction elements that engage the disc 11, as described below.

The electric caliper 10 includes a cylindrical housing 14 having a bore 16 and an L-shaped bridge 18 extending transversely from a front end of the housing 14. The bridge 18 has a leg 20 to move or displace an outer brake pad 22 as will be described. The electric caliper 10 also includes a conventional, generally U-shaped brake pad attachment bracket 24 positioned around the bridge 18. The attachment bracket 24 is operatively attached to the housing 14. For example, a conventional rod (not shown) interconnects the housing 14 and the attachment bracket 24 such that the housing 14 is transversely slidable along the rod, as will be described. It should be appreciated that the attachment bracket 24 is also fixedly attached to vehicle structure of the motor vehicle.

The electric caliper 10 includes an inner brake pad 26 extending radially from an inner attachment bracket leg 28 closest to the housing 14. The disc 11 extends between the outer and inner brake pads 22 and 26. It should be appreciated that, in this example, the electric caliper 10 is of the floating type. During braking, the inner brake pad 26 engages the disc 11, and the resulting reactionary force pulls outer brake pad 22 into engagement with the disc 11. The engagement of the inner and outer brake pads with the disc 11 slows down the wheel or holds the wheel in a fixed position.

A motor 30 is provided for controlling the engagement of the inner brake pad 26 and outer brake pad 22. The motor 30 is fixedly mounted within the bore 16 in the housing 14. Advantageously, positioning the motor 30 inside the housing 14 allows the selection of a motor with a more efficient geometry. In this example, a longer, thinner motor is preferable. The motor 30 includes an axially extending shaft 32 which drives a first stage sun gear 34. The sun gear 34 in turn rotatably engages a plurality of planetary gears 36. The planetary gears 36 are pinned to a first stage carrier 38, and travel about a ring gear 40 fixed to the housing 14.

A second stage carrier 42 has projections 44 that extend into holes 46 on the first stage carrier 38. The projections 44 also carry a second set of planetary gears 48. One or more projections, such as splines or keys 50 are disposed around the perimeter of the second stage carrier 42. The keys 50 are adapted to engage mating splines or keyways 52 formed in an inner surface of a ball screw 54.

In operation, a brake pedal is electrically connected to the electric caliper 10. The application of a force to the brake pedal initiates operation of the motor 30. When the motor 30 is energized, the shaft 32 rotates and causes the sun gear 34 to rotate, which in turn causes the planetary gears 36 to rotate. The planetary gears 36 correspondingly rotate the first stage carrier 38 and the second stage carrier 42. By virtue of the engagement between the keys 50 and the keyways 52, the second stage carrier 42 in turn rotates the ball screw 54. The ball screw 54 includes an outer threaded screw portion 56 that operably engages a correspondingly inner threaded screw portion of a ball screw nut 58. The threaded screw portions cooperatively form a pathway or ball race in which rolling elements, such as spherical balls 60, may be disposed.

Rotation of the screw portion 56 of the ball screw 54 initiates rolling of the balls 60 in the ball race to linearly displace the ball screw nut 58. When the ball screw nut 58 is displaced in the leftward direction as shown in FIG. 1, it in turn displaces the inner brake pad 26 against the disc 11. The resulting pressure that builds up from the inner brake pad 26 against the disc 11 creates a reactionary force that is transmitted back into the housing 14 through the rod. The housing 14 is displaced in the direction away from the disc 11, so that the bridge 18 pulls the outer brake pad 22 toward the disc 11, until both the inner brake pad 26 and outer brake pad 22 are exerting pressure on the disc 11 to slow down or stop the rotation of the wheel. Further details of this arrangement are disclosed in U.S. Pat. No. 6,139,460, the disclosure of which is hereby incorporated by reference.

Typically, a relatively large ball screw 54 is necessary to transfer a load ranging between 12,000 lb. to 15,000 lb. of force, and space within the wheel well is limited. However, by positioning the ball screw 54 around the motor 30 and inside the bore 16 in the housing 14, the size of the ball screw 54 is effectively increased. Advantageously, the reduced pitch of the ball screw 54 and the larger number of balls increase its load carrying capability.

While the embodiment of the invention disclosed herein is presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A ball screw assembly for a motor vehicle electric caliper, the ball screw assembly comprising:

a ball screw having at least one internal groove;

a carrier having at least one projection engaging the at least one groove; and a ball screw nut operatively engaged with the ball screw.

2. The ball screw assembly of claim 1 wherein the carrier has at least one second projection, each second projection engaging a planetary gear.

3. The ball screw assembly of claim 2 wherein the at least one second projection engages a first stage carrier.

4. The ball screw assembly of claim 2 wherein the planetary gear engages a ring gear.

5. The ball screw assembly of claim 4 wherein the ring gear is rotationally fixed relative to the ball screw.

6. The ball screw assembly of claim 3 wherein the first stage carrier engages at least one second planetary gear.

7. The ball screw assembly of claim 6 further comprising:

an electric motor drivingly engaged with the second planetary gear.

8. The ball screw assembly of claim 1 further comprising:

an electric motor drivingly engaged with the carrier.

9. The ball screw assembly of claim 1 wherein the groove comprises a spline.

10. The ball screw assembly of claim 1 wherein the groove comprises a keyway.

11. An electric caliper assembly for a motor vehicle, the electric caliper assembly comprising:

a ball screw having at least one internal groove;

a carrier having at least one projection engaging the at least one groove;

a ball screw nut operatively engaged with the ball screw; and an electric motor drivingly engaged with the carrier.

12. The ball screw assembly of claim 11 wherein the carrier has at least one second projection, each second projection engaging a planetary gear.

13. The ball screw assembly of claim 12 wherein the at least one second projection engages a first stage carrier.

14. The ball screw assembly of claim 12 wherein the planetary gear engages a ring gear.

15. The ball screw assembly of claim 14 wherein the ring gear is rotationally fixed relative to the ball screw.

16. The ball screw assembly of claim 13 wherein the first stage carrier engages at least one second planetary gear.

17. The ball screw assembly of claim 11 wherein the groove comprises a spline.

18. The ball screw assembly of claim 11 wherein the groove comprises a keyway.

19. An electric brake assembly for a motor vehicle, the electric brake assembly comprising:

a caliper adapted to frictionally engaged a rotor of the motor vehicle;

a ball screw having at least one internal groove;

a carrier having at least one projection engaging the at least one groove;

a ball screw nut operatively engaged with the ball screw; and an electric motor drivingly engaged with the carrier and adapted to bias the caliper into frictional engagement with the rotor.

20. The electric brake assembly of claim 19 wherein the groove comprises a keyway.

* * * * *